United States Patent [19]
Kressel et al.

[11] 3,855,607
[45] Dec. 17, 1974

[54] SEMICONDUCTOR INJECTION LASER WITH REDUCED DIVERGENCE OF EMITTED BEAM

[75] Inventors: Henry Kressel, Elizabeth, N.J.; Harry Francis Lockwood, New York, N.Y.; Frank Zygmunt Hawrylo, Trenton, N.J.

[73] Assignee: RCA Corporation, New York, N.Y.

[22] Filed: May 29, 1973

[21] Appl. No.: 364,665

[52] U.S. Cl. .................. 357/18, 357/16, 357/17, 331/94.5 H
[51] Int. Cl. ................................................ H05b 33/00
[58] Field of Search ................ 317/235 N, 235 AC; 331/94.5 H

[56] References Cited
UNITED STATES PATENTS

| | | | |
|---|---|---|---|
| 3,733,561 | 5/1973 | Hayashi | 331/94.5 H |
| 3,758,875 | 9/1973 | Hayashi | 331/94.5 |
| 3,780,358 | 12/1973 | Thompson | 317/235 R |
| 3,783,351 | 1/1974 | Tsukada | 317/235 R |

OTHER PUBLICATIONS

Pavish, et al., Appl. Phys. Letters, Vol. 16, No. 6, 15 Apr. 70.

Primary Examiner—Martin H. Edlow
Attorney, Agent, or Firm—Glenn H. Bruestle; Donald S. Cohen

[57] ABSTRACT

A body of single crystalline semiconductor material having a radiation generating region sandwiched between two other regions. the junctions between the intermediate radiation generating region and each of the outer two regions are heterojunctions which extend to an edge of the body. The intermediate region is of a material having a bandgap energy which is lower than that of the materials of the other two regions but the difference between the bandgap energy of the intermediate region and one of the outer regions is smaller than the bandgap energy between the intermediate region and the other of the outer regions.

9 Claims, 4 Drawing Figures

3,855,607

SEMICONDUCTOR INJECTION LASER WITH REDUCED DIVERGENCE OF EMITTED BEAM

BACKGROUND OF THE INVENTION

The present invention relates to a semiconductor injection laser, and, more particularly to a semiconductor injection laser having a reduced beam divergence.

Semiconductor injection lasers, in general, are bodies of a single crystalline semiconductor material which, when biased, emit light, either visible or infrared, through the recombination of pairs of oppositely charged carriers. Such devices generally include regions of opposite conductivity type forming a PN junction therebetween. When the junction is properly biased, charge carriers of one type are injected from one of the regions into the other where the predominant charge carriers are of the opposite type so as to achieve the light generating recombination.

To provide a semiconductor injection laser which is capable of efficient emission of stimulated radiation at room temperature, various structures have been devised which include an optically confining cavity between regions of opposite conductivity type in which the generation of radiation by the recombination of the charge carriers occurs. The cavity is generally a narrow region extending across the semiconductor body between the ends and side edges of the body. Optical confinement is usually achieved by making the regions of the body on each side of the cavity of a material having an index of refraction lower than that of the material of the cavity. At least one end edge of the body is made partially transmitting so as to form a Fabry-Perot cavity. Thus, the radiation generated in the optically confining cavity is emitted from the partially transmitting end edge of the body as a beam of coherent radiation. Some structures of semiconductor injection lasers having optically confining cavities are described in the articles "Close-Confinement Gallium Arsenide PN Junction Lasers with Reduced Optical Loss at Room Temperature" by H. Kressel et al, RCA REVIEW, Volume 30 No. 1, pages 106–113, Mar., 1969, "High-Order Transverse Cavity Modes in Heterojunction Diode Lasers" by J. Butler et al, APPLIED PHYSICS LETTERS, Vol. 17, No. 9, Nov. 1, 1970, pgs. 403–406, and "An Efficient Large Optical Cavity Injection Laser" by H. F. Lockwood et al, APPLIED PHYSICS LETTERS, Vol. 17, No. 12, Dec. 1, 1970, pgs. 499–502.

A problem with such optically confining cavity semiconductor injection lasers is the divergence of the beam of radiation emitted by the lasers. By "divergence" of the beam is meant that the beam spreads out as it moves away from the emitting end edge of the laser. Generally, these semiconductor injection lasers emit two lobes of light which diverge from each other. Thus, the overall cross-sectional area of the beam in a plane perpendicular to the PN junction of the laser increases along the beam in the direction away from the laser.

In the use of semiconductor lasers the emitted beam of light is directed at a target and it is desirable that the beam contact the target as a spot of controlled area. Therefore, it is desirable that the emitted beam be columnar, i.e. of uniform cross-sectional area along its length, or at least have a minimum of divergence so as to simplify the lensing system which may be needed in the optical system between the semiconductor laser and the target to achieve the desired spot of light at the target.

SUMMARY OF THE INVENTION

A semiconductor injection laser including a body of single crystalline semiconductor material having a first region of one conductivity type, a second region of a conductivity type opposite to that of the first region and a third region between the first and second regions. The third region has at least a portion thereof of a conductivity type which is capable of generating light where a voltage is placed across the body. The junctions between the third region and each of the first and second regions are heterojunctions which extend to an edge of the body. The third region has a bandgap energy which is lower than the bandgap energy of each of the first and second regions. The bandgap energy difference between the third region and the first region is greater than the bandgap energy difference between the third and the second region.

DETAILED DESCRIPTION

Figure 1:
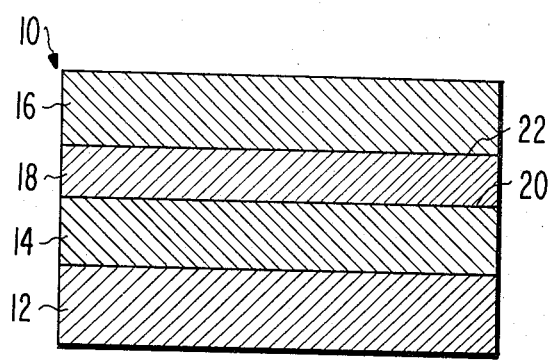
FIG. 1 is a sectional view of one form of the semiconductor injection laser of the present invention.

Referring initially to FIG. 1, one form of the semiconductor injection laser of the present invention is generally designated as 10. The semiconductor injection laser 10 comprises a flat substrate 12 of a high conductivity N type single crystalline semiconductor material, such as gallium arsenide. On a surface of the substrate 12 is a first region 14 of single crystalline N type semiconductor material. A second region 16 of single crystalline, high conductivity P type semiconductor material is over the first region 14, and a third region 18 of single crystalline semiconductor material is between the first region 14 and the second region 16. The third region 18 is of a conductivity type which will generate light, either visible or infrared, when the injection laser 10 is biased with a suitable voltage. Preferably, the third region 18 is of P type since more efficient generation of light is achieved with electron injection. However, the third region 18 may be of N type to achieve generation of light by hole injection. Thus, there is provided a PN junction between the third region 18 and either the second region 16 or the first region 14, depending on the conductivity type of the third region 18.

Figure 2:
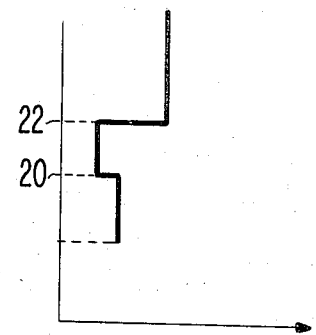
FIG. 2 is a graph showing the bandgap energies of the region of the semiconductor injection laser shown in FIG. 1.

The junctions 20 and 22 between the third region 18 and each of the first and second regions 14 and 16, respectively, are heterojunctions and extend in substantially parallel relation to one another to at least one edge of the semiconductor injection laser 10. Most importantly, as shown in FIG. 2, the third region 18 is of a semiconductor material which has a bandgap energy lower than the bandgap energy of the semiconductor material of each of the first and second regions 14 and 16. Also, the bandgap energy difference between the third region 18 and the first region 14 must be less than the bandgap energy difference between the third region 18 and the first region 16. The bandgap energy difference between the third region 18 and each of the first and second regions 14 and 16 results in a difference in the index of refraction of the regions. Preferably, the bandgap energy differences should be of a magnitude such that the ratio of the difference of the indices of refraction of the third region 18 and the second region 16 to the difference of the indices of refraction of the third region 18 and the first region 14 is in the order of 5 to 1.

There are various semiconductor materials, particularly among the group III–V semiconductor compounds and alloys thereof, which have different bandgap energies and which can be used for the regions of the laser 10. For example, the third region 18 can be made of gallium arsenide and each of the first and second regions 14 and 16 can be made of gallium aluminum arsenide, which has a higher bandgap energy than gallium arsenide. The bandgap energy of gallium aluminum arsenide can be varied by varying the amount of aluminum in the compound. Alternatively, the third region 18, as well as the first and second regions 14 and 16, can be made of gallium aluminum arsenide, with the amount of aluminum in the material of the third region 18 being of an amount appropriately less than the amount of the aluminum in the material of each of the first and second regions so as to provide the required difference in the bandgap energies of the regions. For a semiconductor injection laser 10 made of gallium arsenide and gallium aluminum arsenide or entirely of gallium aluminum arsenide, the preferred ratio of the differences of the indices of refraction can be achieved by making the bandgap difference between the third region 18 and the first region 14 no greater than about 0.025 eV and the bandgap energy difference between the third region 18 and the second region 16 greater than about 0.1 eV. Thus, by making the first region 14 of gallium aluminum arsenide having a small amount of aluminum in the compound, i.e. $Ga_{1-x}Al_xAs$, where $x$ is less than about 0.03, the desired bandgap energy difference of no greater than 0.025 eV between the third region 18 and the first region 14 can be achieved. By making the second region 16 of gallium aluminum arsenide having a greater amount of aluminum in the compound, i.e. $Ga_{1-y}Al_yAs$, where $y$ is greater than 0.1, the desired bandgap energy difference of greater than 0.1 eV between the third region 18 and the second region 16 can be achieved.

The third region 18 may preferably be of a thickness of about 2 micrometers to achieve a laser 10 having high peak power. However, the third region 18 may be thicker or thinner if desired, depending on the desired peak power capability. The semiconductor injection laser 10 is generally in the form of a rectangular parallelepiped. It is formed into a Fabry-Perot cavity by making a pair of opposite side edges and one end edge reflective and the other end edge partially transparent. Terminals are attached to the second region 16 and to the substrate 12 to permit the laser 10 to be connected to a suitable voltage source.

Considering a semiconductor injection laser 10 in which the third region 18 is of P type conductivity, the PN junction of the laser 10 is the junction 20 between the third region 18 and the first region 14. Upon the application of a forward bias voltage to the PN junction 20, electrons are injected from the N type first region 14 into the P type third region 18 and holes from region 16. The injection electrons undergo radiative recombination in the third region 18 with the result that light is generated in the third region 18. The light in the third region 18 propagates along the third region and is emitted from the partially transparent end edge of the laser 10. As previously stated, the bandgap energy differences between the materials of the third region 18 and each of the first and second regions 14 and 16 result in the third region 18 having an index of refraction higher than the index of refraction of each of the first and second regions 14 and 16. This difference in the index of refraction results in a significant portion of the generated light being confined within the third region 18. However, since the bandgap energy difference between the third region 18 and the first region 14 is very small, the index of refraction difference is also very small so that some of the light leaks out of the PN heterojunction barrier 20 into the first region 14. By allowing some of the light to leak out of the third region 18 into the first region 14, the possibility of operation in the high order transverse modes is reduced, resulting in a reduction of the divergence of the two lobes of light emitted from the laser 10. For example, for a semiconductor injection laser similar to the laser 10 made of gallium arsenide and gallium aluminum arsenide, wherein the bandgap energy difference between the third region 18 and each of the first and second regions 14 and 16 are both about 0.1 eV, a divergence of the two emitted lobes of light is about 40° to 50°, and increasing the bandgap energy difference between the third region 18 and each of the first and second regions 14 and 16 further increases the divergence. However, in the semiconductor injection laser 10 of the present invention, a beam divergence of 14° to 30° has been obtained. Thus, the semiconductor injection laser 10 provides a more columnar beam of light so as to permit the use of a more simplified optical system between the laser and a target in order to provide a small spot of light on the target.

A semiconductor injection laser 10 having an N type third region 18 operates in the same manner as described about except that the PN junction is the junction 22 between the third region 18 and the second region 16. Also, the generation of light results from the injection of electrons and holes from the first and second regions 14 and 16, respectively, into the third region 18 where the recombination takes place.

Figure 3:
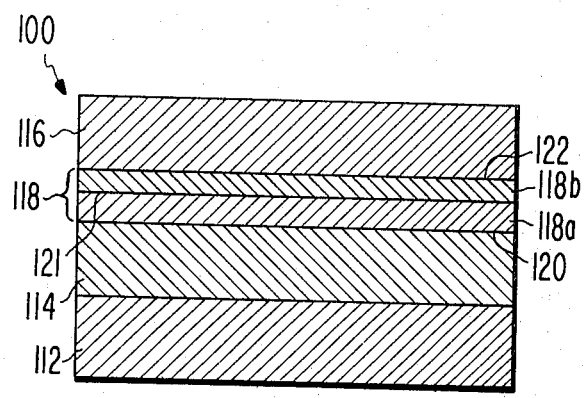
FIG. 3 is a sectional view of another form of the semiconductor injection laser of the present invention.
Figure 4:
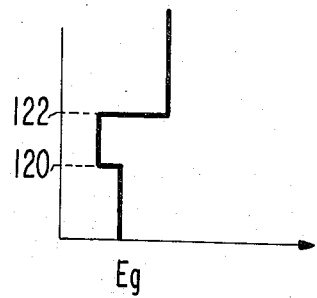
FIG. 4 is a graph showing the bandgap energies of the regions of the semiconductor injection laser shown in FIG. 3.

Referring to FIG. 3, another form of the semiconductor injection laser of the present invention is generally designated as 100. The semiconductor injection laser 100, like the semiconductor laser 10 shown in FIG. 1, comprises a flat substrate 112 of a high conductivity N type single crystalline semiconductor material, such as gallium arsenide, a first region 114 of single crystalline N type semiconductor material on a surface of the substrate 112, a second region 116 of single crystalline high conductivity P type semiconductor material over the first region 114, and a third region 118 of single crystalline semiconductor material between the first region 114 and the second region 116. However, the third region 118 includes two parallel portions 118a and 118b extending thereacross with the portions 118a and 118b being of opposite conductivity types so as to provide a PN junction 121 therebetween. As in the semiconductor injection laser 10 shown in FIG. 1, the junctions 120 and 122 between the third region 118 and each of the first and second regions 114 and 116, respectively, are heterojunctions. Also, as shown in FIG. 4, the third region 118 is of a material having a bandgap energy lower than the bandgap energy of the semiconductor material of each of the first and second regions 114 and 116 with the bandgap energy difference between the third region 118 and the first region 114 being less than the bandgap energy difference between the third region 118 and the second region 116. Preferably, the bandgap energy difference should be of a magnitude that the ratio of the difference of the indices of refraction of the third region 118 and the second region 116 to the difference of the indices of refraction of the third region 118 and the first region 114 is in the order of 5 to 1. If the third region 118 is made of gallium arsenide, it is preferable that the P type portion of the third region 118 adjoin the high heterojunction barrier to achieve optimum operation. This is because electron injection from N type to P type material is favored in gallium arsenide over hole injection from P type into N type material. Thus, if the third region 118 is of gallium arsenide, the portion 118b should be P type and the portion 118a should be N type. However, if the semiconductor injection laser 100 is made of a material where the above condition is not true, then the position of the P type and N type portions of the third region 118 can be reversed. The semiconductor injection laser 100 operates in the same manner as described above with regard to the semiconductor injection laser 10 to emit a beam of light of reduced divergence.

The semiconductor injection laser of the present invention may be made by epitaxially depositing the regions on the substrate with the first region being deposited first, then the third region on the first region and finally the second region on the third region. For the semiconductor injection laser 100 shown in FIG. 3, the two portions of the third region are epitaxially deposited in succession. The regions are preferably deposited by liquid phase epitaxy. The regions may be sequentially deposited on the substrate by liquid phase epitaxy using the method and apparatus described in U.S. Pat. No. 3,565,702, issued Feb. 23, 1971 to H. Nelson, entitled "Depositing Successive Epitaxial Semiconductor Layers From The Liquid Phase." Using the method and apparatus described in said patent, each of the regions can be epitaxially deposited from a heated solution of the semiconductor material and a suitable dopant in a metal solvent. For example, gallium arsenide can be deposited from a solution of gallium arsenide in gallium and gallium aluminum arsenide can be deposited from a solution of gallium arsenide and aluminum in gallium. Tellurium can be added to the solution as an N type dopant and zinc can be added to a solution as a P type dopant. An epitaxial layer can be deposited from a solution by cooling the solution.

What we claim is:

1. A semiconductor injection laser comprising a body of single crystalline semiconductor material having a first region of one conductivity type, a second region of a conductivity type opposite to that of the first region and a third region between said first and second regions, said third region having at least a portion thereof of a conductivity type which is capable of generating light when a voltage is placed across said body, the junctions between said third region and each of said first and second regions being heterojunctions which extend to an edge of the body, and the third region having a bandgap energy which is lower than the bandgap energy of each of the first and second regions with the bandgap energy difference between the third region and the first region being less than the bandgap energy difference between the third region and the second region, such that, the ratio of the difference of the indices of refraction of the third region and the second region to the difference of the indices of refraction of the third region and the first region is in the order of 5 to 1.

2. A semiconductor injection laser in accordance with claim 1 in which the third region forms a PN junction with one of the first and second regions.

3. A semiconductor injection laser in accordance with claim 2 in which the first region is of N type conductivity, the second region is of P type conductivity and the third region is of P type conductivity.

4. A semiconductor injection laser in accordance with claim 1 in which the third region includes portions of opposite conductivity type forming a PN junction therebetween, said portions extending substantially parallel to the heterojunctions between the third region and the first and second regions.

5. A semiconductor injection laser in accordance with claim 4 in which the P type portion of the third region extends along the heterojunction between the third region and the second region.

6. A semiconductor injection laser in accordance with claim 1 in which the third region is of gallium arsenide and each of the first and second regions is of gallium aluminum arsenide with the content of aluminum in the first region being smaller than the content of aluminum in the second region.

7. A semiconductor injection laser in accordance with claim 6 in which the bandgap energy difference between the third region and the first region is not greater than about 0.025 eV and the bandgap energy difference between the third region and the second region is greater than about 0.1 eV.

8. A semiconductor injection laser in accordance with claim 1 in which each of the regions is of gallium aluminum arsenide with the content of aluminum in the third region being smaller than that in each of the first and second regions and the content of aluminum in the first region being smaller than that in the second region.

9. A semiconductor injection laser in accordance with claim 8 in which the bandgap energy difference between the third region and the first region is not greater than about 0.025 eV and the bandgap energy difference between the third region and the second region is greater than about 0.1 eV.

* * * * *

Disclaimer 3,855,607.—*Henry Kressel*, Elizabeth, N.J., *Harry Francis Lockwood*, New York, N.Y., and *Frank Zygmunt Hawrylo*, Trenton, N.J. SEMICONDUCTOR INJECTION LASER WITH REDUCED DIVERGENCE OF EMITTED BEAM. Patent dated Dec. 17, 1974. Disclaimer filed July 28, 1978, by the assignee, *RCA Corporation*.

Hereby enters this disclaimer to claims 1, 2, 3, 4, 5, 6 and 8 of said patent.

[*Official Gazette October 3, 1978.*]